United States Patent [19]
Sontag et al.

[11] Patent Number: 6,140,628
[45] Date of Patent: Oct. 31, 2000

[54] FAST POWER SUPPLY FOR IMAGE INTENSIFYING TUBE

[75] Inventors: Yves Sontag, Bordeaux-Cauderan; Eric Fauvel, Martignas sur Jalles, both of France

[73] Assignee: Sextant Avionique, Velizy Villacoublay, France

[21] Appl. No.: 09/147,764

[22] PCT Filed: Sep. 2, 1997

[86] PCT No.: PCT/FR97/01546

§ 371 Date: Mar. 3, 1999

§ 102(e) Date: Mar. 3, 1999

[87] PCT Pub. No.: WO98/10462

PCT Pub. Date: Mar. 12, 1998

[30] Foreign Application Priority Data

Sep. 3, 1996 [FR] France .................................. 96 10719

[51] Int. Cl.[7] .............................. H01J 29/98; H01J 31/50
[52] U.S. Cl. .................................. 250/207; 250/214 VT; 250/214 LA
[58] Field of Search ............................ 250/207, 214 VT, 250/214 LA, 214 R; 315/149, 150; 313/523, 529, 528, 531, 537, 103 R, 103 CM, 105 CM

[56] References Cited

U.S. PATENT DOCUMENTS

| 3,816,744 | 6/1974 | Chow | 250/214 VT |
|---|---|---|---|
| 3,872,302 | 3/1975 | Fender | 250/214 VT |
| 4,166,213 | 8/1979 | Hoover | 250/214 VT |
| 4,412,128 | 10/1983 | McDonald | 250/214 VT |
| 4,629,881 | 12/1986 | Fairbend et al. | 250/214 VT |
| 4,734,573 | 3/1988 | Dill | 250/214 VT |
| 5,095,202 | 3/1992 | Watase et al. | 250/214 VT |

FOREIGN PATENT DOCUMENTS

| 0 033 574 | 8/1981 | European Pat. Off. . |
|---|---|---|
| 0 156 436 | 10/1985 | European Pat. Off. . |
| 0 447 238 | 9/1991 | European Pat. Off. . |
| 1 457 883 | 12/1976 | United Kingdom . |

Primary Examiner—John R. Lee
Attorney, Agent, or Firm—Oblon, Spivak, McClelland, Maier & Neustadt, P.C.

[57] ABSTRACT

A fast power supply for an image intensifier tube used in night vision devices. The tube includes a microchannel amplification wafer placed between a photocathode and an output screen. The supply of the tube delivers a reference voltage to a first terminal of the wafer, a variable voltage to the second terminal of the wafer, a variable photocathode voltage and an output screen voltage. The illumination of the output screen is measured by its screen current. Beyond one screen value, and in order to maintain constant output illumination while avoiding dazzle, the voltage at the second terminal of the wafer is slaved to the changes in the screen current and is different from the photocathode voltages fixed. The circuit for controlling the circuit at the second terminal of the wafer includes a high voltage amplifier with transistors having small quiescent consumption and high control speed for decreasing or increasing the voltage as a function of the variations in the screen current.

13 Claims, 3 Drawing Sheets

FAST POWER SUPPLY FOR IMAGE INTENSIFYING TUBE

The present invention relates to a fast power supply for an image-intensifier tube such as those used in night vision devices.

BACKGROUND OF THE INVENTION

In a system for assisting with night-time vision, an image-intensifier tube makes it possible to deliver an image of the outside world similar to that obtained under daytime conditions. Such a system may consist of night vision sights or binoculars which are placed in front of the observer's eyes and are designed so that an intensified image of the outside world is formed on the retina.

These sights or binoculars may be independent or, for example, integrated in an aircraft pilot's helmet.

A system for assisting with night-time vision may also comprise a light-intensifier tube associated with a CCD camera and a display device.

In the known way, an image-intensifier tube generally comprises a photocathode placed behind an input window of the tube, a microchannel wafer and an output screen. It operates in the following way:

the photons corresponding to the ambient lighting pass through the input window of the tube and enter the photocathode, and cause the latter to emit electrons which are accelerated between the photocathode and the input of the wafer.

the electrons are further accelerated and multiplied in the channels of the wafer by a phenomenon involving multiple collisions against the walls of the channels, at the output of the wafer, the electrons are again accelerated by the highly positive potential of the output screen and strike the latter's photoemissive layer, which causes the emission of photons and the reproduction of a visible image at the output.

Ambient luminosity which is too weak to allow visibility to the naked eye can thus be sufficient to obtain a visible image at the output of the image-intensifier tube.

The accelerations and the multiplication of the electrons in the tube are due to the application of appropriate voltages to various elements of the image-intensifier tube, such as the photocathode, the microchannel wafer and the output screen. These voltages are delivered by the electrical power supply of the tube.

An advantageous power supply has to comply with a variety of constraints which are difficult to reconcile.

Firstly, when the ambient luminosity is very weak, the power supply must allow enough light intensification to present a visible image to the operator using the system for assisting with night-time vision.

Furthermore, when the ambient luminosity is too strong, the power supply must allow protection of the tube to prevent, for example, damage to the output screen or the microchannel wafer an excessive number of, or too highly energetic electrons. In this case, the power supply may fully cut off the light intensification or very greatly reduce the gain of the tube.

In the intermediate range of values of ambient luminosity, the power supply must also make it possible to control the gain of the tube in order to intensify the light received at the input of the tube while avoiding the presentation of too bright an image to the operator at the output of the tube.

An advantageous power supply will automatically ensure, on the output screen of the intensifier tube, an image with approximately constant average illumination irrespective of the value of the ambient luminosity above a minimum threshold. It should as far as possible react quickly enough to prevent dazzle in case of an abrupt increase in the outside luminosity, and to prevent "black holes" in case of an abrupt drop in luminosity. The human eye is very sensitive to excessively strong luminosity, even over a very short time (of the order of a few hundred microseconds); it furthermore reacts slowly to adapt to an abrupt decrease in luminosity.

With current devices, and under some working conditions, the reaction time of the device when confronted with abrupt variations in luminosity is too high, on the one hand in the case of increase but, on the other hand, above all in case of decrease. These various requirements impose stringent constraints on the voltage supplies of the elements of the image intensifier.

Furthermore, an additional constraint comes from the fact that a system for assisting with night-time vision may be used, for example, by an aircraft pilot or by a land vehicle driver, and also by an infantryman. Thus, for use which does not greatly encumber the user, a system for assisting with night-time vision is generally portable and must be capable of being powered by a battery; for this reason, the energy efficiency of the power supply must necessarily be high. What is more, since the space available is very limited, bulky solutions are inappropriate.

The difficulty therefore consists in producing a power supply which meets the various constraints indicated above.

The object of the invention is to solve this difficulty with a power supply having a high-voltage regulation device for a light-intensifier tube, regulating the gain of the tube by varying the voltage of the wafer using a high-voltage amplifier whose architecture makes it possible to obtain a high reaction speed with low consumption.

To this end, an image-intensifier tube is proposed which comprises a photocathode, a microchannel amplification wafer, an output screen and a supply circuit producing a first reference voltage which is applied to a first terminal of the wafer, a second variable voltage which is applied to a second terminal of the wafer, a third variable voltage which is applied to the photocathode and a fourth voltage which is applied to the output screen, the supply circuit comprising a means for measuring the current consumed by the output screen and a circuit for controlling the second variable voltage which is applied to the wafer, this control circuit producing a fixed voltage so long as the current of the screen does not exceed a threshold and, beyond this threshold, a variable voltage slaved to the changes in the current of the output screen in one sense tending to keep this current substantially constant, the supply circuit furthermore comprising means for keeping substantially constant, beyond the said threshold, the difference between the third variable voltage applied to the photocathode and the second variable voltage applied to the wafer. The tube is characterized in that the circuit for controlling the variable wafer voltage comprises a high-voltage amplifier with transistors having low quiescent consumption and high speed in controlling the variation of the second voltage as a function of the variations in the screen current, both for increasing this voltage and for decreasing it.

Preferably, the high-voltage amplifier includes two sets of transistors in series, each connected on the one hand to the wafer, and on the other hand, to a respective supply potential. It also comprises a means for controlling the conduction of at least one of the transistors of one of the sets. The transistors of the two sets are biased so as to have low conduction in the absence of variation of the voltage of the wafer, i.e. of the second variable voltage applied to the wafer; and they are also biased so that the transistors of one of the sets on the one hand deliver current to the wafer at the instigation of the control means in order to vary the wafer voltage in one sense and that on the other hand the transistors of the other set draw current from the wafer at the instigation of the control means in order to vary the wafer voltage in the other sense.

The transistors are preferably P-channel MOS transistors in the two sets.

BRIEF DESCRIPTION OF THE DRAWINGS

The invention will be understood more clearly from the following description which is given with reference to the appended figures.

DETAILED DESCRIPTION OF THE PREFERRED EMBODIMENTS

Figure 1:
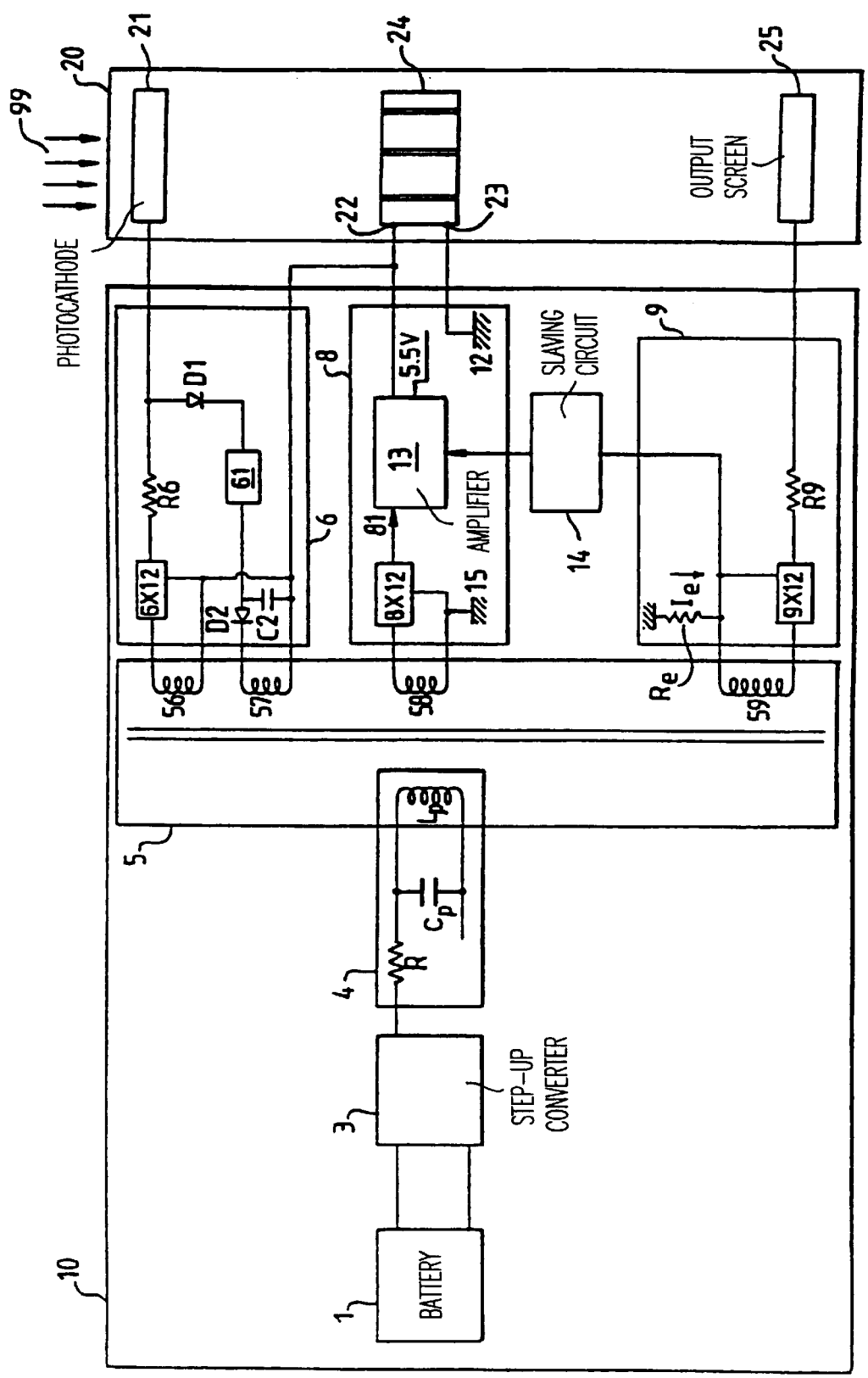
FIG. 1 represents a light-intensifier tube with its power supply according to the invention.

A diagram of the high-voltage supply 10 supplying an image-intensifier tube 20 is represented in FIG. 1.

As its energy source, the power supply 10 preferably comprises a battery 1 connected to a step-up voltage converter 3, itself connected to a converter 4 supplying a multi-output transformer 5.

The battery 1 delivers a DC voltage in a range of 1.5 volts to 5 volts, for example, and this voltage is applied to the input of a step-up voltage converter 3. The step-up voltage converter 3 makes it possible to provide a DC voltage whose value is more stable than that obtained directly from the terminals of the battery which is subject to variations in the course of its life.

The value of the voltage at the output of the step-up converter 3 is, for example, 5.5 volts.

The step-up converter 3 is connected to a soft-switching converter 4 such as, for example, a Royer self-oscillator.

The self-oscillator comprises a resistor R, a capacitor Cp and a primary winding with inductance Lp.

The multi-output transformer 5 delivers AC voltages with fixed values to the supply units 6, 8 and 9. These units deliver DC voltages to the various electrodes of the light-intensifier tube 20, and in particular to the photocathode 21, to the input 22 of the microchannel wafer 24, to the output 23 of the wafer 24 and to the output screen 25 of the tube 20.

The values of these voltages, and changes to them, make it possible to obtain the desired mode of operation irrespective of the ambient luminosity level.

The voltages applied by the supply units to the electrodes are referenced either in relation to a fixed-potential reference or in relation to another electrode. Thus, unit 8 delivers a first fixed voltage (earth reference 12 or fixed potential relative to an earth 12) to the output 23 of the wafer 24, and a second variable voltage to the input 22 of the wafer. Unit 6 delivers a third variable voltage to the photocathode, but this voltage is referenced in relation to the second variable voltage. In addition, unit 9 delivers a fourth voltage (in principle fixed) to the output screen 25, this voltage being referenced in relation to a fixed potential which may be the earth 12. The variable voltages make it possible, as will be seen, to regulate the gain of the tube in order to obtain the desired illumination on the output screen as a function of the luminosity conditions in the scene being observed.

The function of the supply unit 6 is to deliver a voltage between the photocathode 21 and the input 22 of the microchannel wafer 24 in order to make it possible to extract and accelerate electrons from the photocathode when photons 99 originating from an observed scene are received. The emitted electrons are received at the wafer input.

The function of the supply unit 8 is to deliver a voltage between the input 22 of the wafer 24 and the output 23 of the wafer. The electrons received at the wafer input are accelerated and multiplied as far as the output of the wafer by the potential difference between the two terminals 22 and 23 of the wafer. When the term "wafer voltage" is used below, this should be taken to mean the absolute value of the voltage which is applied between the input and the output of the wafer. The wafer input potential and the photocathode potential are negative relative to the voltage reference (preferably fixed) which the wafer output constitutes.

The supply unit 9 delivers a positive high voltage which is applied to the output screen 25 of the tube, making it possible to accelerate the electrons which are exiting the wafer and will strike the screen.

On striking the screen 25, the electrons lead to the flow of a screen current $l_e$ in the unit 9. This current represents the average current consumed by the output screen, and is commensurately higher if the output image is more luminous.

The screen current $l_e$ is measured by a resistor interposed in series between the earth and the other elements of the supply unit 9.

Figure 2:
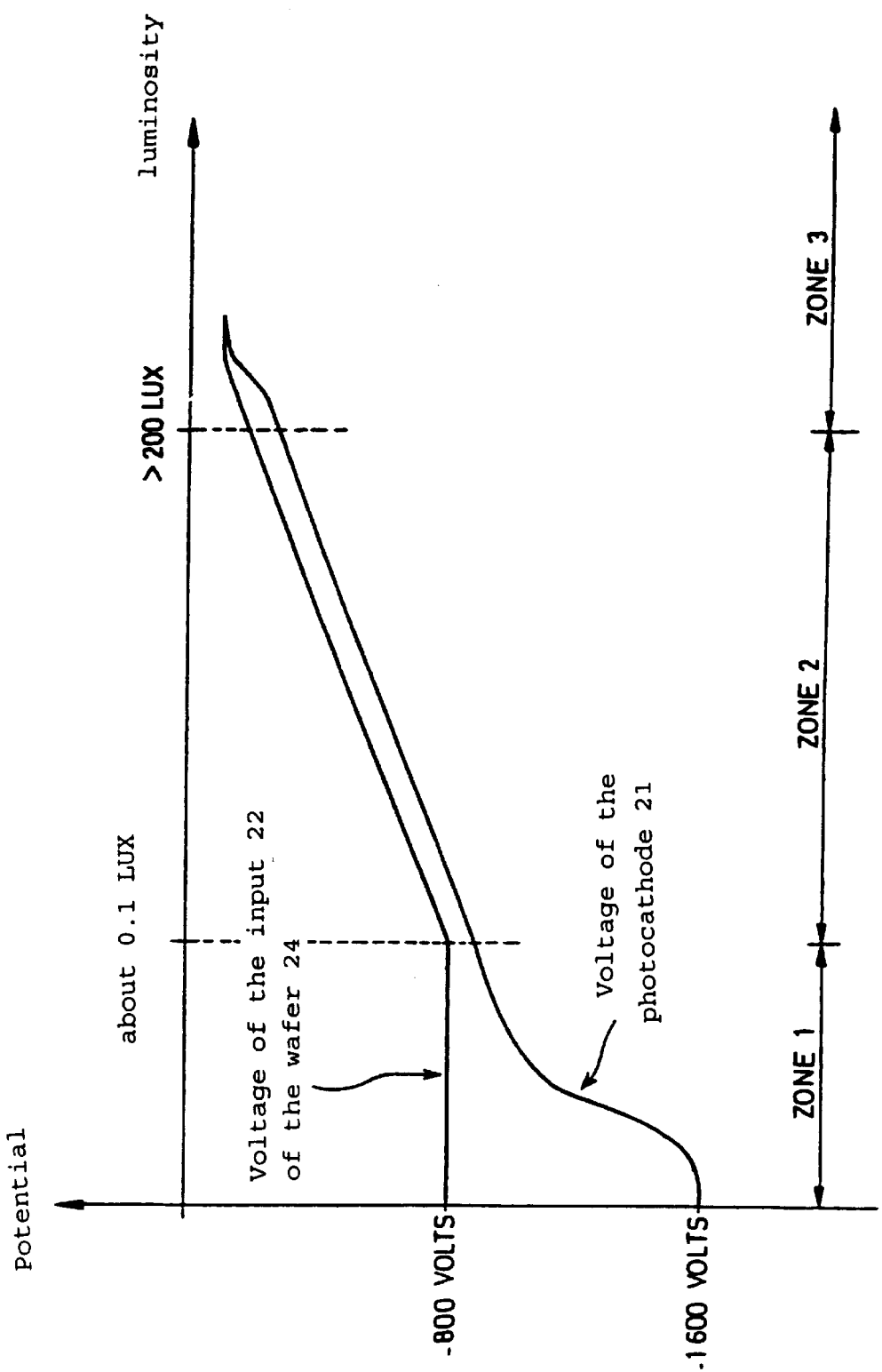
FIG. 2 represents the voltages at the terminals of two electrodes of an image-intensifier tube as a function of the ambient luminosity.

The intention is to arrange that the potentials of the photocathode 21 and of the input 22 of the wafer vary as indicated in FIG. 2 as a function of the ambient luminosity entering the image-intensifier tube. The potential at the input 22 of the wafer is represented by a continuous line and the potential of the photocathode 21 is represented by a broken line.

The desired operating profile is divided into three main zones, respectively corresponding to very low scene luminosity, moderate luminosity and excessive luminosity.

In zone 1, under very weak ambient luminosity conditions (below or very much below 0.1 lux for example), voltages with very high absolute values are applied to the photocathode and to the wafer in order to obtain strong intensification of light by the gain of the tube between the input and the output of the tube. Then, as the scene luminosity increases, the difference between the photocathode voltage and the wafer input voltage is reduced, but without changing the wafer voltage. In this zone, the potential of the wafer input is fixed and is about −800 to −1000 volts, corresponding to the maximum voltage which can be applied between the input and the output of the wafer (a potential which may if appropriate be regulated using a potentiometer).

The photocathode potential may be of the order of about −1600 volts for the weakest luminosities, and then decreases rapidly as soon as the luminosity increases, so as to approach the wafer input potential, and this reduces the total gain of the tube.

At this end of zone 1, the gain of the tube remains substantially constant, because the wafer voltage and the photocathode voltage are substantially constant. The luminosity of the output screen increases with the input luminosity.

In zone 2, above a certain average luminosity value for the observed scene, for example 0.1 lux, and up to a maximum ambient luminosity value of 200 lux, for example, the gain of the tube is slaved, by altering the wafer voltage, so that a substantially constant average luminosity is maintained on the output screen. Given that the luminance gain of the intensifier tube is substantially proportional to the wafer voltage (at substantially constant voltage between the photocathode and the wafer input), the wafer voltage will decrease approximately linearly with the increase in the luminosity of the observed scene, in order to obtain an approximately constant luminosity at the output.

The average output luminosity around which the system will be slaved can preferably be regulated using a potentiometer, the user being able to choose the luminosity which suits him. Adjusting this potentiometer shifts the threshold above which the wafer voltage slaving will be implemented.

In zone 2 of FIG. 2, as the ambient luminosity increases, the wafer voltage is decreased to reduce the gain and the photocathode voltage is varied in parallel so that the potential difference between the photocathode and the input of the wafer remains at an approximately constant limited value (32 volts in the example described).

Lastly, in zone 3, for an ambient luminosity greater than a 200 lux threshold, for example, which could cause damage to the photocathode or the microchannel wafer, the tube is protected by a drastic reduction in the emission of electrons by the photocathode. This sharp reduction is obtained by making the potential difference between the photocathode and the input of the wafer practically zero.

Generally, a night vision system is used when the ambient luminosity is below a few lux, a value of 200 lux corresponding, for example, to the presence of vehicle headlights in the field of view of the system.

In order to obtain all the gain variation zones as explained with reference to FIG. 2, the supply units are constructed in the following way:

Unit 6 is intended to deliver the supply voltage of the photocathode. To this end, the transformer 5 delivers an AC voltage at the terminals of one of its secondary windings, which is referenced 56. This voltage is applied to the input of the supply unit 6, is rectified there and is multiplied by a voltage multiplier 6X12 formed, for example, by a twelve-stage diode pump. This voltage is referenced in relation to the wafer input potential, itself defined by the supply unit 8, that is to say one terminal of the winding 56 is connected to the wafer input 22, the other terminal of the winding being used to establish a voltage for the photocathode.

The supply unit 6 is designed so as to deliver a photocathode potential approximately 800 volts less than the wafer input potential when the ambient illumination is very weak, and to reduce the difference between the photocathode potential and the wafer input potential very greatly when the illumination increases.

This feature is obtained by using a series resistor R6, through which the photocathode current flows, in order to make the potential of the photocathode drop when the photocathode current rises (which takes place when the illumination increases). The resistor R6 has a high resistance (about 15 GΩ) chosen according to the maximum current desired in the photocathode when the tube is operating at very high gain in zone 1 of FIG. 2.

The electrons emitted by the photocathode 21 which is connected to the supply unit 6 cause a photocathode current i to flow. When the photocathode current i is zero, the output voltage of the unit 6 is, for example, −800 volts (defined by the winding 56 and the multiplier 6X12), and when the ambient luminosity increases, the current i increases, which decreases the absolute value of the potential difference delivered by the unit 6.

This decrease is, however, limited by virtue of another winding 57 in the unit 6, this winding delivering a current which does not flow through the resistor R6. The winding 57 is associated with a rectifying assembly D2, C2, and makes it possible to define a fixed voltage (32 volts) for the difference between the cathode and the wafer input at the end of zone 1, and in zone 2 of FIG. 2. By way of explanation, when the voltage delivered by the winding 56 falls because of the current increase in the resistor R6, the set, 57, D2, C2, which is connected to the photocathode by a diode D1, takes up the slack to deliver a fixed voltage between the photocathode and the wafer input.

This fixed value limits the emission of electrons by the photocathode so as not to damage the wafer, while nevertheless giving the electrons enough energy to penetrate the wafer, since the tube would otherwise no longer deliver an output image. This value of the voltage difference depends on the tube and lies between 30 and 45 volts for the tubes generally used in systems for assisting with night-time vision. In the example described, 32 volts was chosen.

Lastly, a current limiter 61 protects the photocathode 21 in case of currents which are too strong. It is called into play for the operating mode in zone 3, and makes it possible to reduce the difference between photocathode voltage and wafer voltage by a value of about 2 volts when the photocathode current flowing in the limiter 61 exceeds a value corresponding to an ambient luminosity of 200 lux, for example.

The supply unit 9 is intended to deliver the supply voltage of the output screen 25. This voltage is in principle fixed and, for example, equal to 5.7 kV. It is referenced in relation to the output 23 of the wafer (reference potential). The transformer 5 delivers an AC voltage at the terminals of the secondary winding 59; this AC voltage is rectified and multiplied in unit 9 by a voltage multiplier 9X12 formed, for example, by a twelve-stage diode pump. The voltage multiplier is in series with a current-limited resistor R9 with a high resistance, for example about 22 MΩ.

Unit 8 delivers the wafer voltage. Given the fact that, in zone 2, this voltage is slaved to the average luminosity of the output screen, this unit 8 is controlled by a slaving circuit 14 which receives, as its input information, a measurement of the screen current originating from the supply unit 9. The screen current is measured in unit 9, by for example, a small resistor Re which is earthed and connected in series between the electrical chain comprising the earth, the winding 59 and the output screen 25.

The supply unit 8 includes a high-voltage amplifier 13 capable of delivering a variable voltage (under the control of the slaving circuit 14) between, on the one hand, the input 22 of the wafer and, on the other hand, the output 23 connected to earth 12 or to a reference potential close to this earth. The transformer 5 delivers an AC voltage at the terminals of its secondary winding 58, which voltage is applied to the input of unit 8. In unit 8, the input voltage is rectified and multiplied by the voltage modifier 8X12, formed for example by a twelve-stage diode pump, and it supplies, on a negative supply terminal 81, a high-voltage amplifier 13 which delivers a negative variable voltage to the wafer input 22, this negative voltage varying, for example, between 10 and 1000 volts.

Figure 3:
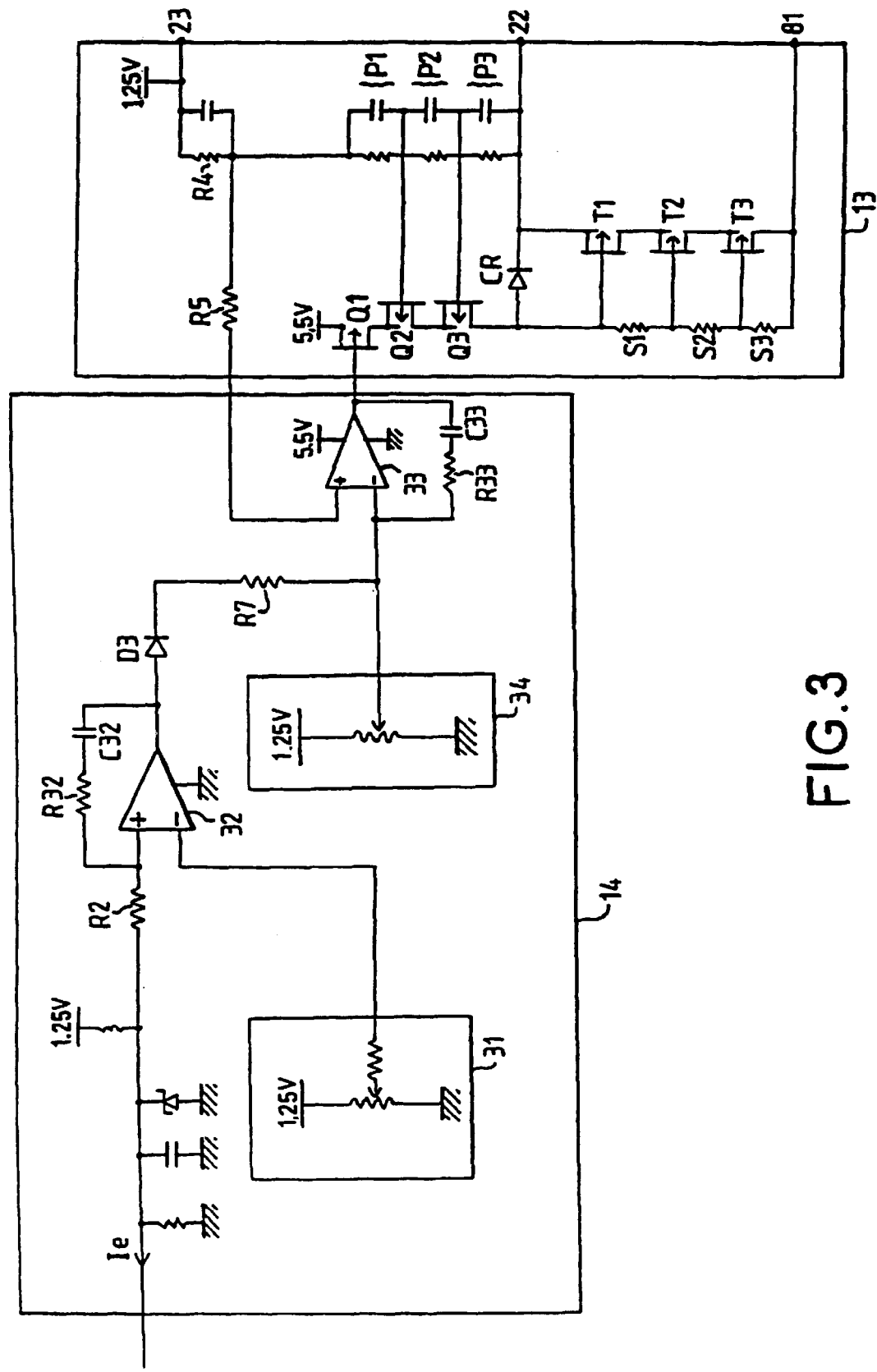
FIG. 3 represents the high-voltage amplifier and its regulation circuit.

The high-voltage amplifier 13 and its associated slaving circuit 14 are represented in FIG. 3.

The amplifier 13 is supplied between a fixed reference voltage and a fixed negative high voltage. The fixed reference voltage is that of the wafer output. It may be connected to earth, or, preferably here, to a fictitious earth of, for example, +1.25 volt; this fictitious earth facilitates use, in the slaving circuit 14, of low-voltage amplifier supplied between 0 and 5 volts rather than amplifiers supplied symmetrically between +5 volts and −5 volts. The fixed negative high voltage is applied to the supply terminal 81 of the amplifier 13; its value is for example −1050 volts.

The output of the amplifier 13 is connected to the wafer input 22.

The detailed construction of the amplifier 13 will be returned to below.

The slaving circuit 14 essentially comprises two low-voltage operational amplifiers and two regulating potentiometers.

The maximum value U of the wafer voltage applied in operating zone 1 of FIG. 2 depends on the characteristics of the tube. The power supply can be matched to the tube by adjusting this maximum value using a potentiometer 34 connected to the inverting input of a low-voltage operational amplifier 33. The operational amplifier tends, as will be seen, to slave the wafer voltage to a value determined by the setpoint voltage present at this inverting input. The network comprising a resistor R33 and a capacitor C33 contributes to the stability of the loop formed by the operational amplifier 33 and the high-voltage amplifier 13.

The threshold around which the average luminosity of the output screen is to be slaved can be adjusted using a potentiometer 31. This potentiometer is connected to the non-inverting input of another low-voltage operational amplifier 32 which also receives, at its inverting input and through a resistor R2, the measurement of the screen current originating from unit 9. The role of the amplifier 32 is to compare the screen current measurement with the threshold defined by the potentiometer. The network comprising a resistor R32 and a capacitor C32 contributes to the stability of the gain slaving loop.

The output of the amplifier 32 is connected by a diode D3 and a resistor R7 to the inverting input of the amplifier 33. The diode establishes a threshold function in the following way: when the screen current $I_e$ is small and below the threshold S corresponding to constant illumination, the amplifier 32 is in saturation to earth and the diode D3 stays off. The amplifier 32 does not have any effect on the status of the amplifier 33 placed downstream. When the screen current exceeds the threshold S, the amplifier 32 changes and acts on the amplifier 33 by modifying the setpoint level on the inverting input of the latter. This modification of the setpoint level consequently modifies the voltage applied to the wafer.

The setpoint to which the amplifier 33 slaves the wafer voltage is thus the sum of a fixed value, defined by the potentiometer 34, and of a value which is zero below the illumination threshold and which varies with the screen current beyond this threshold; this variable value is defined by the output of the amplifier 32.

These two values are added at the inverting input of the amplifier 33, which is connected both to the potentiometer 34 and to the amplifier 32 through the resistor R7 and the diode D3.

The amplifier 33 slaves the wafer voltage in the following way: a fraction of the wafer voltage is applied to the non-inverting input of the amplifier 33 via a resistor R5. This fraction is obtained by means of a resistive divider bridge established between the outputs 22 and 23, this divider bridge furthermore being used to bias the high-voltage transistors of the amplifier 13.

The amplifier 33 compares this fraction with the setpoint voltage and controls the high-voltage amplifier 13 in order to make it modify the wafer voltage until the wafer voltage fraction at its non-inverting input is substantially equal to the setpoint voltage at the inverting input.

The structure of the amplifier 13 is as follows: it includes two sets, each having a plurality of transistors in series, these transistors having high voltage ratings in view of the voltages of the order of 1000 volts which are to be controlled. The use of a plurality of transistors in series makes it possible to distribute the voltage over the various transistors. The first set, here three transistors in series Q1, Q2, Q3, makes it possible to control the delivery of current to the wafer in order to discharge the wafer capacitance and therefore decrease the wafer voltage. The second set, here three transistors in series T1, T2, T3, makes it possible to draw current from the wafer and therefore charge the latter by increasing the wafer voltage applied to it.

The first set is connected between the wafer input 22 (output of the amplifier 13) and a fixed voltage reference which may be earth or the 1.25 volt fictitious earth, or, preferably here, a +5.5 volt supply used to supply the operational amplifiers 32 and 33. Preferably, a diode CR is connected between the first set and the output 22 in order to send to the wafer the current delivered by the first set Q1, Q2, Q3 when the wafer voltage needs to be decreased abruptly, and to limit the reverse voltage on the gate of the transistor T1 which is off during this transient period.

The first transistor Q1 of the first set, connected to the 5 volt positive supply, is controlled by the output of the amplifier 33; it tends to conduct a greater current when the output voltage of the amplifier 33 decreases, and tends to conduct a lesser current when this output voltage increases (the transistors are preferably P-channel MOS transistors). The other transistors Q2, Q3 of the first set are biased by the resistive divider P1, P2, P3 which is connected between the terminals 22 and 23 of the wafer. The biasing is carried out in such a way that the transistors share the overall voltage (about 1000 volts) which the amplifier 13 has to withstand. By virtue of the divider bridge, the conduction of the transistors Q2 and Q3 follows the control procedure for increasing or decreasing the conduction of the transistor Q1. Capacitors may be placed at the terminals of the divider bridge in order to improve the response time of the transistors Q2 and Q3.

The second set of transistors T1, T2, T3 is connected between the wafer input (output of the amplifier 13) and the negative high-voltage supply terminal 81. They are biased by another resistive divider bridge S1, S2, S3 for distributing the voltage rating over the various transistors. The transistors of the second set are preferably also P-channel MOS transistors. Their increase or decrease in conduction is driven by the divider bridge S1, S2, S3 and proceeds in the opposite sense to that of the transistor Q1 of the first set.

The amplifier formed in this way is an amplifier with low quiescent current (that is to say a low current consumed when the wafer voltage is in a fixed regime). It reacts rapidly to a signal corresponding to an increase in conduction of the transistors of the first set in case of the need to lower the wafer gain (in case of dazzle, in particular). This is because a reduction in the gate voltage of Q1 at the instigation of the amplifier 33 not only makes the transistor conduct more, but also makes the drain voltage of the transistors Q2 and Q3 increase without initially changing their gate voltage, by increasing it by virtue of the capacitances of the divider bridge, so that these transistors themselves also start to conduct more current.

The amplifier 13 also reacts rapidly in case of the need to increase the luminosity gain (after dazzling has taken place, for example). This is because an increase in the gate voltage of Q1 decreases its conduction, immediately lowering the potential of the divider bridge S1, S2, S3 and therefore the potential of the gates of T1, T2, T3, which increases the conduction of these latter, allowing current to be drawn from the wafer input terminal 22. The wafer, which is capacitive, then charges rapidly and the wafer voltage is increased and the input potential 22 of the wafer is brought to a more negative value.

By way of example, three MOS transistors in series, each having a breakdown voltage of 500 volts, make it possible to construct a series assembly which withstands the voltages used in the supply unit 8.

The amplifier 13 used in the tube according to the invention is therefore an amplifier having low consumption, with fast rise and fall speeds for carrying out very rapid automatic regulation of the gain of the tube, avoiding dazzle to the operator and avoiding a black hold after dazzling has taken place.

A complementary symmetrical arrangement could be produced by combining N- and P-channel transistors in order to obtain yet greater speed, but this will be ore difficult to control.

An arrangement of the same type as the one described above may be produced with PNP bipolar transistors, but since these transistors are current-driven, the currents consumed by the bases of the transistors require a reduction in the impedance of the biasing divider bridges, the consequence of which is to greatly increase consumption.

It will be noted that the supplier voltage 81 of the amplifier 13 does not need to be regulated precisely, and is obtained simply using a winding 58 from the same transformer as for supplying the screen. This avoids the risks of beating which could be caused by the presence of several asynchronous high-voltage converters.

Among the advantages of the invention, it will moreover be noted that the wafer is at a potential close to earth, which allows direct regulation without involving the intermediary of a very high-voltage insulation circuit. The gain control has high sensitivity.

What is claimed is:

1. An image-intensifier device, comprising:
    a photocathode;
    a microchannel amplification wafer having first and second terminals;
    an output screen; and
    a supply circuit configured to produce a first reference voltage which is applied to the first terminal of the wafer, a second variable voltage which is applied to the second terminal of the wafer, a third variable voltage which is applied to the photocathode and a fourth voltage which is applied to the output screen,
    wherein the supply circuit comprises:
        means for measuring the current consumed by the output screen;
        a control circuit including a high-voltage amplifier and a slaving circuit configured to control the amplifier, said control circuit configured to control the second variable voltage applied to the second terminal of the wafer and to produce a fixed voltage of the wafer so long as the current of the output screen does not exceed a threshold, and beyond the threshold, to produce a variable voltage of the wafer slaved to changes in the current of the output screen to keep the current of the output screen substantially constant; and
        means for keeping substantially constant, beyond the threshold, a difference between the third variable voltage applied to the photocathode and the second variable voltage applied to second terminal of the wafer,
    wherein the amplifier includes first and second transistor sets in series, each of the first and second transistor sets connected to the wafer and to a respective supply source.

2. The device according to claim 1, wherein the slaving circuit controls the conduction of at least one transistor of the second transistor set, the transistors of the first and second transistor sets being biased so as to have low conduction in an absence of variation in the variable voltage applied to the second terminal of the wafer, and being biased so the transistors of the first transistor set deliver current to the wafer in accordance with the slaving circuit in order to vary a voltage of the wafer and the transistors of the second transistor set draw current from the wafer in accordance with the slaving circuit in order to vary the voltage of the wafer.

3. The device according to claim 2, wherein the transistors of the first and second transistor sets are P-channel MOS transistors.

4. The device according to claim 3, wherein one of the transistors of the first transistor set has its gate controlled by the slaving circuit, the other transistors of the first transistor set have their gates controlled by a first divider bridge, and the transistors of the second transistor set have their gates controlled by a second divider bridge.

5. The device according to claim 1, further comprising:
    a first operational amplifier configured to compare the output screen current with an illumination threshold;
    a second operational amplifier configured to compare a fraction of the voltage of the wager with a setpoint value; and
    means for establishing as the setpoint value a sum of a fixed value and a variable value,
    wherein the variable value is delivered by the first operational amplifier to the second operational amplifier when the output screen current exceeds the illumination threshold.

6. The device according to claim 2, further comprising:
    a first operational amplifier configured to compare the output screen current with an illumination threshold;
    a second operational amplifier configured to compare a fraction of the wafer voltage with a setpoint value; and
    means for establishing as the setpoint value a sum of a fixed value and a variable value,
    wherein the variable value is delivered by the first operational amplifier to the second operational amplifier when the output screen current exceeds the illumination threshold.

7. The device according to claim 3, further comprising:
    a first operational amplifier configured to compare the output screen current with an illumination threshold;
    a second operational amplifier configured to compare a fraction of the wafer voltage with a setpoint value; and means for establishing as the setpoint value a sum of a fixed value and a variable value, wherein the variable value is delivered by the first operational amplifier to the second operational amplifier when the output screen current exceeds the illumination threshold.

8. The device according to claim 4, further comprising:

a first operational amplifier configured to compare the output screen current with an illumination threshold;

a second operational amplifier configured to compare a fraction of the wafer voltage with a setpoint value; and means for establishing as the setpoint value a sum of a fixed value and a variable value, wherein the variable value is delivered by the first operational amplifier to the second operational amplifier when the output screen current exceeds the illumination threshold.

9. An image-intensifier device, comprising:

a photocathode;

a microchannel amplification wafer having first and second terminals;

an output screen; and a supply circuit configured to produce a first reference voltage which is applied to the first terminal of the wafer, a second variable voltage which is applied to the second terminal of the wafer, a third variable voltage which is applied to the photocathode and a fourth voltage which is applied to the output screen, wherein the supply circuit comprises:

a resistive element configured to measure the current consumed by the output screen;

a control circuit including a high-voltage amplifier and a slaving circuit configured to control the amplifier, said control circuit configured to control the second variable voltage applied to the second terminal of the wafer and to produce a fixed voltage of the wafer so long as the current of the output screen does not exceed a threshold, and beyond the threshold, to produce a variable voltage of the wafer slaved to changes in the current of the output screen to keep the current of the output screen substantially constant; and a supply unit configured to keep substantially constant, beyond the threshold, a difference between the third variable voltage applied to the photocathode and the second variable voltage applied to second terminal of the wafer, wherein the amplifier includes first and second transistor sets in series, each of the first and second transistor sets connected to the wafer and to a respective supply source.

10. The device according to claim 9, wherein the slaving circuit controls the conduction of at least one transistor of the second transistor set, the transistors of the first and second transistor sets being biased so as to have low conduction in an absence of variation in the variable voltage applied to the second terminal of the wafer, and being biased so the transistors of the first transistor set deliver current to the wafer in accordance with the slaving circuit in order to vary a voltage of the wafer and the transistors of the second transistor set draw current from the wafer in accordance with the slaving circuit in order to vary the voltage of the wafer.

11. The device according to claim 10, wherein the transistors of the first and second transistor sets are P-channel MOS transistors.

12. The device according to claim 11, wherein one of the transistors of the first transistor set has its gate controlled by the slaving circuit, the other transistors of the first transistor set have their gates controlled by a first divider bridge, and the transistors of the second transistor set have their gates controlled by a second divider bridge.

13. The device according to claim 9, further comprising:

a first operational amplifier configured to compare the output screen current with an illumination threshold;

a second operational amplifier configured to compare a fraction of the voltage of the wafer with a setpoint value; and a diode and a resistor connected in series to an output of the first operational amplifier and to an inverting input of the second operational amplifier; and a potentiometer connected to an output of the resistor and to the inverting input of the second operational amplifier, wherein the setpoint value a sum of a fixed value and a variable value, and wherein the variable value is delivered by the first operational amplifier to the second operational amplifier when the output screen current exceeds the illumination threshold.

* * * * *